United States Patent Office 3,355,048
Patented Nov. 28, 1967

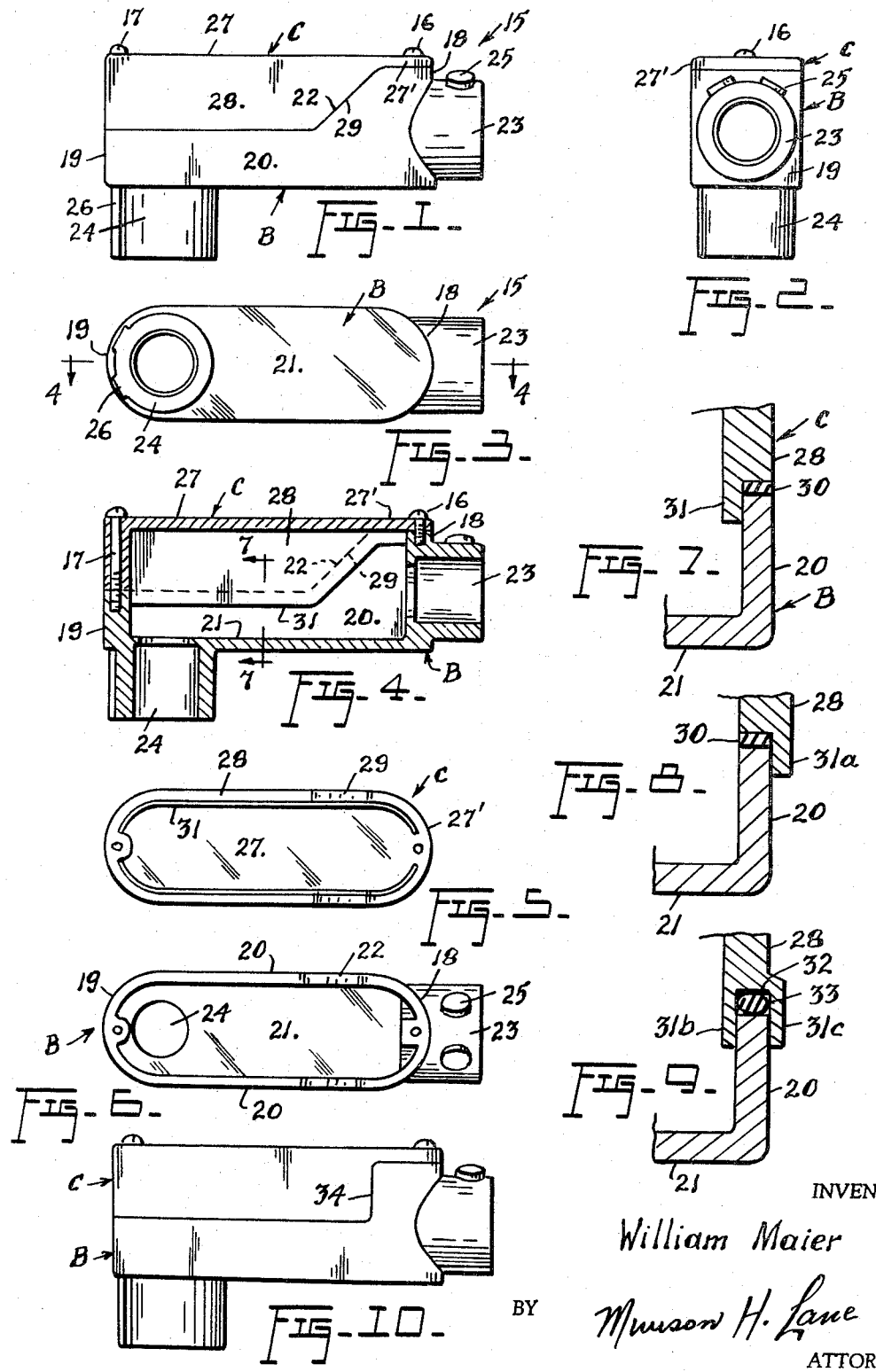

3,355,048
JUNCTION BOXES FOR ELECTRICAL CONDUITS
William Maier, 125 Lawlor Terrace, Stratford, Conn. 06075
Filed May 3, 1966, Ser. No. 547,226
7 Claims. (Cl. 220—3.94)

This invention relates to new and useful improvements in junction boxes for electrical conduits, and the principal object of the invention is to permit electric wires to be easily drawn into such boxes and conveniently connected together, without undue obstruction by the body of the box itself.

In particular, the invention concerns itself with a junction box for conduits extending at right angles to each other, where conventional boxes with a simple, flat cover plate are too confined and restrictive for convenient manipulation of tools used in drawing wires through the conduits into the box. Also, especially at service entrances where heavy wires are employed, difficulty is experienced in bending such wires to project outside the box so that wire connectors may be applied thereto, and when the connected wires are subsequently bent back into the box, the connections often become loose.

The invention eliminates these disadvantages of conventional junction boxes by providing a box which consists of a base section and a complemental cover section separably secured together. The base section, which is provided with conduit sockets, has stepped or relieved side walls and a low end wall so that when the cover section is removed, the interior of the base section is exposed for drawing and connection of wires in a much more convenient manner than was heretofore possible.

The box of the invention is simple in construction, durable, and lends itself to economical manufacture.

With the foregoing more important object and features in view and such other objects and features as may become apparent as this specifications proceeds, the invention will be understood from the following description taken in conjunction with the accompanying drawings, wherein like characters of reference are used to designate like parts, and wherein:

FIGURE 1 is a side elevational view of a junction box in accordance with the invention;

FIGURE 2 is an end view thereof;

FIGURE 3 is a bottom plan view;

FIGURE 4 is a longitudinal sectional view, taken substantially in the plane of the line 4—4 in FIG. 3;

FIGURE 5 is a plan view of the underside of the cover section;

FIGURE 6 is a plan view of the base section;

FIGURE 7 is an enlarged, fragmentary sectional detail, taken substantially in the plane of the line 7—7 in FIG. 4;

FIGURE 8 is a sectional detail, similar to that in FIG. 7, but showing a modified arrangement;

FIGURE 9 is a sectional detail showing another modified arrangement; and

FIGURE 10 is a side elevational view of still another modified embodiment of the box.

Referring now to the accompanying drawings in detail, more particularly to FIGS. 1–7 inclusive, the junction box of the invention is designated generally by the reference numeral 15 and comprises two main components, namely, a base section B and a cover section C which is removably secured to the base section by a pair of screws 16, 17.

The base section B includes a relatively high, rounded end wall 18, a relatively low, rounded end wall 19, with connecting side walls 20 and a bottom wall 21. The upper edges of the side walls 20 are stepped obliquely downwardly as indicated at 22 from the level of the high end wall 18 to that of the low end wall 19, as will be apparent from FIGS. 1 and 4.

A tubular conduit receiving socket 23 is formed integrally on the exterior of the high end wall 18, while a similar socket 24 is provided exteriorly on the bottom wall 21 adjacent the low end wall 19, the axes of these sockets thus being disposed at right angles so that conduits extending at right angles may be joined by the box. The sockets 23, 24 are provided with thickened portions or bosses 25, 26, respectively, which may be drilled and tapped for reception of set screws (not shown) to secure the conduits in the sockets.

The cover section C includes a top wall 27 having rounded ends, one such rounded end 27' of the top wall overlying the high end wall 18 of the base section B. The cover section also has a depending marginal skirt 28 rounded at the other end of the top wall, the side portions of the skirt 28 being upwardly stepped as at 29 from the level of the rounded skirt end to the top wall end 27'. The skirt thus conforms to and abuts the upper edges of the low end wall 19 and stepped side walls 20 of the base section B, so as to complete the box when the sections B and C are assembled.

A perimetrically continuous gasket 30 is interposed between the mating edges of the box sections B and C to render the box dustproof and waterproof. The gasket is carried by the cover section C and in order to retain the gasket in place on the cover section, the skirt 28 is formed integrally with a depending flange 31 which, as shown in FIG. 7, extends downwardly past the inner edge of the gasket to overlap the upper edge portions of the side walls 20 and low end wall 19 of the base section B at the inside of these side and end walls.

In a slightly modified arrangement shown in FIG. 8, the skirt flange 31a extends downwardly past the outer edge of the gasket and overlaps the base section at the outside rather than the inside thereof.

In another modified arrangement shown in FIG. 9, the skirt 28 is provided with mutually spaced inner and outer depending flanges 31b and 31c, respectively, which overlap the base section at both the inside and outside thereof. The space between these flanges forms a groove 32 in which the gasket 33 is positioned and in which the upper edge of the base section is received, as will be clearly apparent.

In the embodiments thus described the stepped side walls 20 of the base section B and the stepped skirt portions of the cover section C are stepped (at 22 and 29 respectively) in an oblique direction relative to the bottom wall 21 and to the top wall 27. However, if so preferred, they may be stepped perpendicularly rather than obliquely, as indicated at 34 in FIG. 10.

In any event, it will be apparent that when the cover section is removed from the base section, the downwardly stepped side walls and the low end wall of the base section expose the interior of the base section so that wires may be conveniently drawn thereinto and connected together with much greater ease than is possible in conventional boxes having sides and ends of uniform height and a relatively small top opening with a simple flat cover plate.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. An electrical conduit junction box, comprising an elongated box body consisting of a base section and a complemental cover section removably secured thereto, said base section having rounded first and second end walls with connecting side walls and also having a bottom wall, conduit receiving sockets provided exteriorly on the first end wall and on the bottom wall adjacent the second end wall, said first end wall being relatively high and the second end wall being relatively low and said side walls being stepped downwardly from the high end wall to the low end wall whereby to facilitate convenient access to the interior of said base section when the cover section is removed, said cover section having a top wall with rounded ends one of which overlies the high end wall of the base section and also having a depending marginal skirt rounded at the other end of the top wall with side portions of the skirt being stepped upwardly from the rounded skirt end to the first mentioned end of said top wall, said skirt being in complemental abutment with said low end wall and said stepped side walls of the base section.

2. The device as defined in claim 1 together with a gasket interposed between said base section and said cover section.

3. The device as defined in claim 1 togther with a depending flange provided at the lower edge of said skirt and overlapping upper edge portions of said low end wall and side walls of the base section at the inside thereof.

4. The device as defined in claim 1 together with a depending flange provided at the lower edge of said skirt and overlapping upper edge portions of said low end wall and side walls of the base section at the outside thereof.

5. The device as defined in claim 1 together with mutually spaced inner and outer depending flanges provided at the lower edge of said skirt and overlapping upper edge portions of said low end wall and side walls of the base section both at the inside and outside thereof.

6. The device as defined in claim 1 wherein said stepped side walls of said base section and said stepped side portions of said skirt are stepped in a plane oblique to said bottom wall.

7. The device as defined in claim 1 wherein said stepped side walls of said base section and said stepped side portions of said skirt are stepped in a plane perpendicular to said bottom wall.

No references cited.

DONALD F. NORTON, *Primary Examiner.*

J. B. MARBERT, *Assistant Examiner.*